T. G. PALMER.
HEATER.
APPLICATION FILED MAY 19, 1909.

949,042.

Patented Feb. 15, 1910.

Witnesses:

Inventor.

UNITED STATES PATENT OFFICE.

TRUMAN G. PALMER, OF CHICAGO, ILLINOIS.

HEATER.

949,042.  Specification of Letters Patent.  Patented Feb. 15, 1910.

Application filed May 19, 1909. Serial No. 497,056.

*To all whom it may concern:*

Be it known that I, TRUMAN G. PALMER, a citizen of the United States, residing at Chicago, county of Cook, and State of Illinois, have invented certain new and useful Improvements in Heaters; and I do hereby declare the following to be a full, clear, and exact description of the invention, such as will enable others skilled in the art to which it appertains to make and use the same.

This invention has reference to heating devices, and more particularly to devices of this kind which are used in connection with hydrocarbon burners and of the type described in Letters Patent No. 855,904, granted me on June 4, 1907.

The object of the present invention is to provide a heater in which the separate baffle or deflector used according to the above mentioned patent is dispensed with, the devices which form the baffle being formed integral with the wall of the heater. To this end the fins or flanges which extend inward from the wall of the heater are made of such length that they extend substantially to the center of the heating shell, whereby the heat is deflected laterally to a maximum extent without decreasing the area of the heating surface. The fins or vanes are also arranged in superposed rows, and they are formed in the special manner which will hereinafter appear. The heating shell is preferably used in connection with a reflector by means of which the heat waves are deflected laterally in the desired direction in a very effective way.

Figure 2:
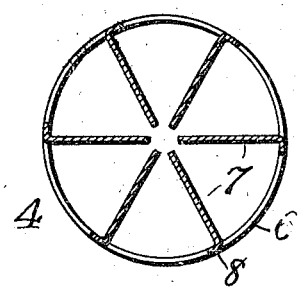
Figure 1:
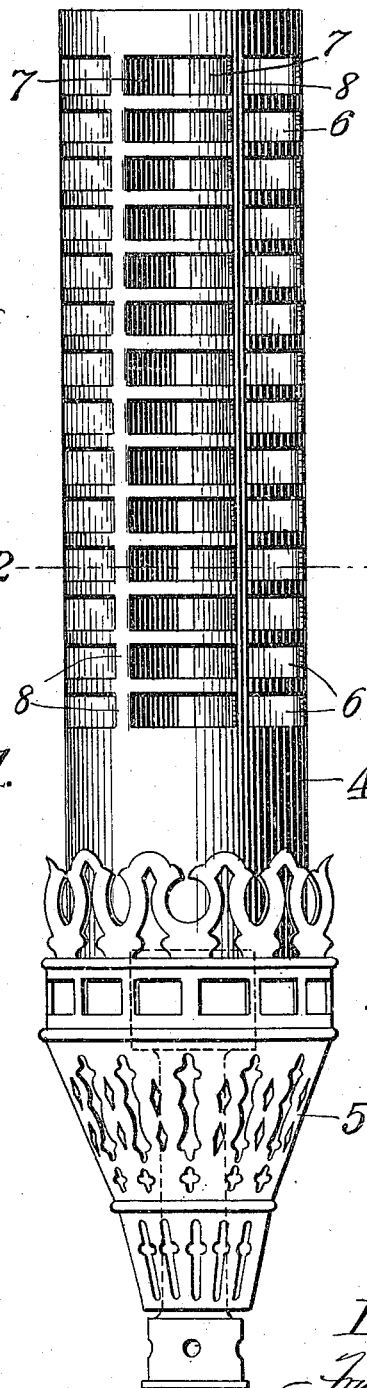
Figure 3:
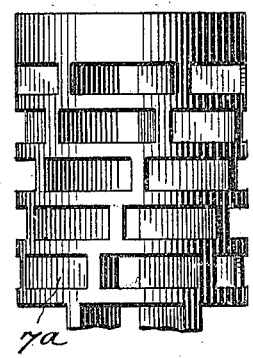
Figure 4:
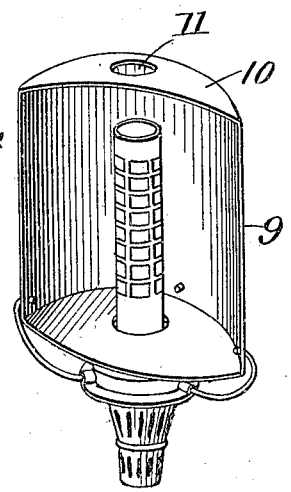

In the accompanying drawing:—Figure 1 is an elevation of a heater constructed in accordance with the invention, shown as used in connection with a gas burner of well known type. Fig. 2 is a section on the line 2—2 of Fig. 1, Fig. 3 is a detail elevation of a portion of a shell which is somewhat modified in form, and Fig. 4 is a perspective view of the heater as it appears when used in connection with a reflector.

In the drawing the metallic heat radiating shell 4 is shown as placed upon and used in connection with a gas burner 5 of the well known type, but it should be understood that it is the particular construction of the shell that forms the subject matter of this invention, and that such shell may be used in conjunction with burners of widely different form.

According to this invention the shell 4 is made of a single piece of metal having cut therein a plurality of superposed rows or series of rectangular perforations or slots 6, which rows or series of slots extend in horizontal direction throughout the cylindrical surface of the shell. The metal is separated from three edges of each perforation or slot but at the remaining edge it is left integral with the shell, such remaining edge being one of the upright side edges. This portion of the shell which is struck up out of each slot is bent inward in radial direction to form a straight fin or vane 7, as shown in Fig. 2, the length of the slots 6 and consequently of the vanes or fins 7 being so chosen that the latter will extend substantially to the center of the shell, as shown.

In the form of the device shown in Fig. 1 the slots 6 of the several series or rows are in vertical alinement with each other, and the upright connecting portions 8, which are formed at the side edges of the slots, are also in vertical alinement. In this manner there is formed a shell which is provided with radial vanes or fins located in vertically alined horizontal rows or series and extending substantially to the center of the shell.

When the device is in use, and the flame from the burner passes upward into the shell, the vanes or fins 7 not only absorb the heat of the flame and radiate it in a very effective manner, but they also act in conjunction to form a baffle located within the shell and serving to deflect the heat of the burner in lateral direction. Hence a device is furnished which can be formed of a single piece of sheet metal and which provides for a maximum radiation and lateral deflection of the heat arising from the burner.

Fig. 3 illustrates a modification of the device in which the vanes 7ª of the several horizontal series are not in vertical alinement but are arranged in staggered relation, whereby a number of spiral series of vanes extending in substantially upright direction are formed. A device of this kind causes the gases of combustion to take a spiral course in rising in the shell, and such a construction has been found very efficient in deflecting the heat laterally.

The improved heater is preferably used in connection with a reflector, as shown in Fig. 4, whereby the heat waves may be effectively deflected in any desired lateral direction. The reflector 9 is approximately semi-cylindrical in shape and incloses the heating shell at one side only, so that the heat is deflected out into the room. The top 10 of the reflector is provided with an opening 11 alined with the heating shell and acting to promote a good draft. Of course provision is made, in mounting the reflector on the burner, for turning the former at will, in order to make it act in different directions.

What I claim is:—

1. A heater for use with hydrocarbon burners, comprising a cylindrical shell made of a single piece of metal and having superposed horizontal series of straight vanes projecting inwardly in radial direction and extending substantially to the center of the shell.

2. A heater for use with hydrocarbon burners, comprising a cylindrical shell having a plurality of superposed rows or series of rectangular slots cut in its wall, the metal at one side edge of each slot being left integral with the shell and extended inwardly substantially to the center of the shell.

3. A heater for use with hydrocarbon burners, comprising a cylindrical shell having a plurality of superposed rows or series of rectangular slots cut in the cylindrical wall thereof, the slots of the several rows or series being arranged in staggered relation, and the metal at one side only of each slot being left integral with the shell and extended in inward direction to form a deflecting vane.

4. The combination of a heating shell of substantially cylindrical form, and an approximately semi-cylindrical reflector at one side of said shell and extending throughout the height of the same, said reflector having a top with an opening alined with the heating shell.

In testimony whereof I affix my signature, in presence of two witnesses.

TRUMAN G. PALMER.

Witnesses:
M. A. SEDGWICK,
AARON GOVE.